(12) United States Patent
Wolters et al.

(10) Patent No.: US 7,328,004 B1
(45) Date of Patent: Feb. 5, 2008

(54) ADVERTISING SYSTEM USING RADIO COMMUNICATION BETWEEN ADVERTISER AND CONSUMER

(75) Inventors: Peggy Justina Antoinette Wolters, Tilburg (NL); Peter Reginald Lewis, East Sussex (GB)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 717 days.

(21) Appl. No.: 10/362,036

(22) PCT Filed: Aug. 24, 2000

(86) PCT No.: PCT/EP00/08357

§ 371 (c)(1),
(2), (4) Date: Feb. 18, 2003

(87) PCT Pub. No.: WO02/17285

PCT Pub. Date: Feb. 28, 2002

(51) Int. Cl.
*H04M 3/42* (2006.01)

(52) U.S. Cl. .................. 455/414.1; 455/41.2; 455/419; 455/3.06; 455/3.04; 455/406; 709/203; 709/206; 709/217; 705/14; 705/26; 715/719

(58) Field of Classification Search .............. 455/3.06, 455/3.02, 3.04, 419, 420, 412.1, 412.2, 414.1, 455/41.2; 340/825.72; 348/734; 705/14, 705/26; 715/719; 283/56
See application file for complete search history.

(56) References Cited

U.S. PATENT DOCUMENTS

| | | | |
|---|---|---|---|
| 5,204,768 A * | 4/1993 | Tsakiris et al. ............. | 398/107 |
| 5,959,623 A * | 9/1999 | van Hoff et al. ............ | 715/719 |
| 6,107,937 A * | 8/2000 | Hamada ................ | 340/825.69 |
| 6,128,484 A * | 10/2000 | Singkornrat et al. ........ | 455/420 |
| 6,144,848 A * | 11/2000 | Walsh et al. ................ | 455/419 |
| 6,278,499 B1 * | 8/2001 | Darbee et al. ............. | 348/734 |
| 6,397,275 B1 * | 5/2002 | Clapp et al. .................. | 710/60 |
| 6,446,130 B1 * | 9/2002 | Grapes ....................... | 709/231 |
| 6,450,407 B1 * | 9/2002 | Freeman et al. ............ | 235/492 |

(Continued)

FOREIGN PATENT DOCUMENTS

JP    2000022811 A    1/2000

(Continued)

OTHER PUBLICATIONS

Database WPI, Derwent Publication Ltd., London, GB, AN 2000-681753, XP002162746.

*Primary Examiner*—Marceau Milord
(74) *Attorney, Agent, or Firm*—Michael Cameron

(57) ABSTRACT

Advertisement system and method of advertising by using one or more advertiser devices, which each corresponds to an advertisement which is perceptible by a user of a consumer device. The advertiser device and the consumer device are equipped with a nearby radio control device, such as based on Bluetooth technology, and a controller connected thereto. Upon coming into each others range the radio devices establish a communication path through which a user of the consumer device is enabled to fetch an advertisement identification and additional information related to the advertisement. The user may communicate with the advertiser device to leave personal information, such as an address, to be contacted later by the advertiser. He may also fetch data, such as an URL, by which he can contact the advertiser later.

1 Claim, 1 Drawing Sheet

U.S. PATENT DOCUMENTS

| | | | |
|---|---|---|---|
| 6,484,011 B1 * | 11/2002 | Thompson et al. | 455/3.06 |
| 6,504,580 B1 * | 1/2003 | Thompson et al. | 348/734 |
| 6,549,625 B1 * | 4/2003 | Rautila et al. | 380/258 |
| 6,574,793 B1 * | 6/2003 | Ngo et al. | 725/32 |
| 6,654,825 B2 * | 11/2003 | Clapp et al. | 710/60 |
| 6,725,203 B1 * | 4/2004 | Seet et al. | 705/14 |
| 6,748,462 B2 * | 6/2004 | Dubil et al. | 710/8 |
| 6,810,526 B1 * | 10/2004 | Menard et al. | 725/46 |
| 6,920,614 B1 * | 7/2005 | Schindler et al. | 715/726 |
| 6,950,646 B2 * | 9/2005 | Pradhan et al. | 455/406 |

FOREIGN PATENT DOCUMENTS

| | | |
|---|---|---|
| JP | 2000224658 A | 8/2000 |
| WO | WO 00/02389 | 1/2000 |

* cited by examiner

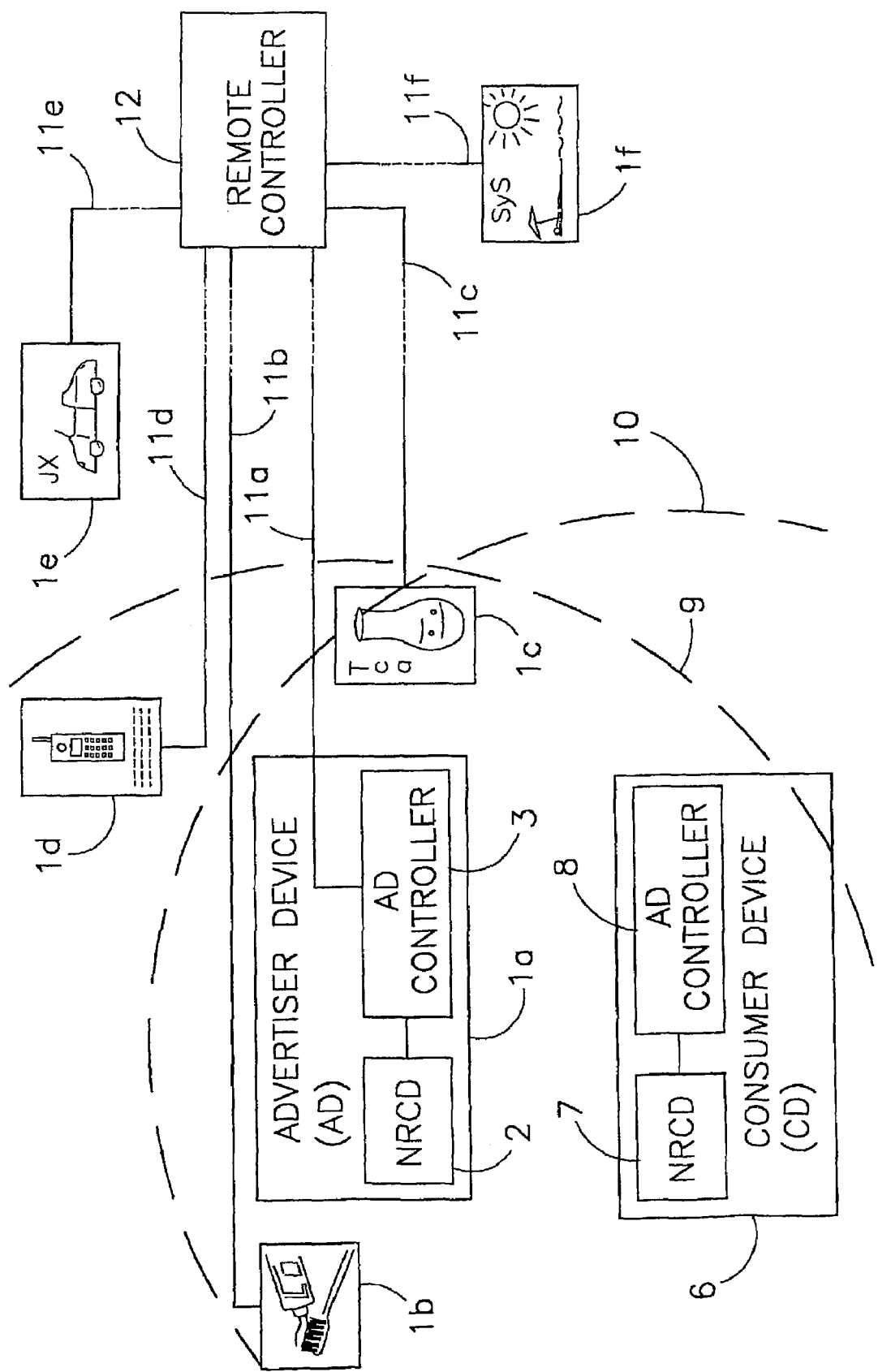

ADVERTISING SYSTEM USING RADIO COMMUNICATION BETWEEN ADVERTISER AND CONSUMER

BACKGROUND OF THE INVENTION

The invention relates to an advertisement system and method of advertising using nearby radio communication between advertiser and consumer devices.

In particular, the nearby radio communication is established by the use of Bluetooth (trademark of Telefonaktiebolaget LM Ericsson, Sweden) technology. For details about Bluetooth reference is made to http://www.bluetooth.com.

Today, any person travelling through areas with high traveller throughput will be bombarded by many advertisements. Examples are on escalators in the underground, on a moving walkway in an airport, etc.

Many of these advertisements today attempt to get across their message in an attractive manner and provide additional details for the consumer to later remember or act upon. One such example is the inclusion on the billboard of a world wide web address.

Many travellers however end up with spare minutes sitting waiting for trains/plains etc., and it would be beneficial to the advertising companies if they could catch the potential customers during this time.

From the consumer view point, the majority of humans are just that, humans. Humans are well known as having memory failures, and quite often totally forget about advertisements (especially due to the number they see every day). Therefore, it occurs quite often that a consumer is often unhappy with himself because he can remember seeing an important or interesting advertisement, but he cannot remember the company or the details.

What is required is some system and method that ensure an interested customer to be provided with all the details of an advertisement he wants. In addition, it would be very beneficial if the advertiser was provided details of the customer who is interested.

In order for the consumer to ensure that he has all the correct details, the only methods he has presently is to enter the information on the advertisement into a data store. A data store could be anything from a filofax, to a laptop, to a personal digital assistant (PDA).

Of course entering data into a data store requires effort, and quite often the traveller is busy or has many items to carry. At least entering data is troublesome.

SUMMARY OF THE INVENTION

Advertisers must use some of the valuable advertising space to present visually the contact details that could be put to better usage catching the eye of the consumer.

Humans are fallible, their memory fails, they are lazy, they get annoyed. Most often or not, the consumer fails to note down the information that he is interested in.

More and more individuals today are equipping themselves with mobile phones. At the same time, the mobile phones are becoming more and more feature rich and versatile. New technologies such as Wireless Application Protocol (WAP) and Bluetooth are being introduced to make mobile phones more central to a human beings daily existence.

As such, it is expected that the number of mobile phone users will increase still significantly over the next few years.

It is an object of the invention to extend the possibilities of use of the type of hardware mentioned above for presenting advertising information and advertisement related information to consumers at will by the consumers.

The system and method according to the invention allow a consumer to obtain and display at will with his mobile consumer device details of an advertisement, for example shown on a billboard as an advertiser device, and information related to the advertisement which is not necessarily shown by the advertisement or otherwise contained in the advertiser device itself. The consumer also has the possibility to communicate personal data, such as name, postal address and e-mail address and telephone number, with a request to the advertiser to contact him or to provide additional information to the address mentioned by him.

Other features and advantages of the invention will be apparent from the description below with reference to the enclosed drawing, which shows schematically an advertisement system according to the invention in which the method of advertising according to the invention is applied.

BRIEF DESCRIPTION OF THE DRAWINGS

FIG. 1 is a block diagram of a radio communication system in accordance with the teachings of the present invention.

DETAILED DESCRIPTION

The system shown in the drawing comprises several advertiser devices, such as billboards, 1a to 1f. Advertiser devices 1b to 1f show different pictures on it as examples of respective advertisements.

The advertiser devices 1a-1f may have different shapes and dimensions but, as shown for advertiser device 1a, are all equipped with a nearby radio communication device (in the drawing: NRCD) 2, and, connected thereto, an advertiser device (AD) controller 3.

The advertisement system also comprises one or more consumer devices (CD) 6, which contains a nearby radio communication device (NRCD) 7 and, connected thereto, a consumer device (CD) controller 8.

The consumer device 6 is a device which is mobile with respect to the advertiser devices 1. The consumer device 6 can be of any type, such as a mobile phone or a vehicle.

The nearby radio communication devices 2, 7 are dedicated to the exchange of information related to an advertisement shown by or associated with the corresponding advertiser device 1a. Presently, Bluetooth (trademark owned by Telefonaktiebolaget LM Ericsson, Sweden) chips can be used for each of the nearby radio communication devices 2, 7 of the system according to the invention. Bluetooth refers to a technology which is adopted by more than 1600 companies. It is estimated that by 2002 more than 100 million mobile phones, computers and other types of electronic equipment will incorporate this technology. Equipment equipped with Bluetooth technology, when enabled, automatically searches for other Bluetooth-compliment equipment. Because of small radio signal strengths their effective range will be just about 10 m. In the drawing the nearby radio communication devices 2, 7 of the advertisement device 1a and the consumer device 6 have ranges 9, 10 respectively. On contact between two of such nearby radio communication devices 2, 7, information is exchanged, which allows these devices to determine whether or not to establish a connection. At this first encounter, the Bluetooth devices 2, 7 transmit a personal identification number (PIN). After that, no further identification process is necessary. Up to eight devices can operate at the same time in a Bluetooth cell. Moreover, each Bluetooth device can be active in several cells at the same time. Although any type of equipment may incorporate Bluetooth technology, communication between them is conditional dependent on the type of equipment. That is, devices equipped with Bluetooth technology must have matching profiles, for example relating to communication with computers, cameras and fixed-line interfaces. A profile is essentially a data protocol which sits on top of the Bluetooth protocol.

With the system according to the invention a Bluetooth profile for the nearby radio communication devices 2, 7 preferably supports at least the following roles:

1. acting as a consumer (built into devices such as a mobile terminal 6 or screen phone);

2. acting as an advertiser (built into devices such as a billboard or digital TV e.g. devices 1*a* to 1*f*).

Preferably, the profile supports one or more of the following transactions:

1. request for advertisement identity (consumer to advertiser);

2. submission of personal (business card) information (consumer to advertiser);

3. request for immediate contact by the advertised company to details on the personal information (consumer to advertiser);

4. request for standard package of advertisement content information (consumer to advertiser);

5. request for URL fetch (consumer to advertiser).

Upon coming into range of each other the nearby radio communication devices 2, 7 exchange identification information according to a standard (Bluetooth) communication protocol. Upon establishing a communication between the nearby radio communication devices 2, 7 the user of consumer device 6 may operate the consumer device 6 to interrogate the advertiser device 1*a* for an advertisement identification which the advertiser device 1*a* contains in its controller 3 and which refers to its corresponding advertisement. When having fetched such advertisement identification the user may operate the consumer device 6 to demand additional information relating to the advertisement from the advertiser device 1*a*.

Data received by the consumer device 6 from the advertiser device 1*a* may be presented in different ways to the user of the consumer device 6, such as visually and audibly. In particular the additional data received from the advertiser device 1*a* has a standardised format, such as WML or HTML, such that it can be viewed by using a browser, such as with a WAP capable phone. In this regard, dependent on the data demanded by the user of the consumer device 6 the advertiser device 1*a* establishes a communication path 11*a* to a remote controller 12. The remote controller 12 can be anything from a nearby computer or a remote computer serving one to numerous advertiser devices 1. The communication paths 11*a* to 11*f* can be of any type and length, from a few meters of fixed wiring to a public or private global communication network, such as Internet.

Having such possibilities of communication the user of the consumer device 6 has many ways to leave his personal data for personal contact later and to fetch small to huge amounts of data relating to the advertisement or advertiser from the advertiser device 1*a* directly or through the advertiser device 1*a* from any remote computer, such as remote controller 12 or an Internet server hosting web pages of the advertiser. In case the nearby radio communication device 7 looses contact with the nearby radio communication device 2 of the advertiser device 1*a* the user of consumer device 6 may operate his device, if being a WAP capable phone, to establish a communication path directly with such Internet server. In that case the data retrieved from the advertiser device 1*a* by the consumer device 6 should have contained an URL relating to the advertisement.

It may well happen that the nearby radio communication device 7 of a consumer device 6 is within range with several nearby radio control devices 2 of different advertiser devices 1 at the same time, such as advertising devices 1*a*, 1*b* and 1*c* as shown. Preferably the advertisement identifications from those different advertiser devices 1 are displayed in a specific order by the consumer device 6. This will enable the user of the consumer device 6 to quickly scan the basic information provided by those advertisement identifications for the one he is most interested in. One ordering type may be by category of advertisement, to which extent the advertisement identification must comprise a category identification. The different advertisement identifications may also by displayed in an order which is dependent from the strength of a radio signal by which the respective advertisement identifications were received. This requires a radio signal detection means in the consumer device 6 and a labelling means for labelling the different radio signals dependent on their strengths.

The system and method according to the invention benefits both the advertiser and consumer.

The consumer may fetch additional information from an advertisement which caught his eye without the risk of forgetting details of the advertisement for obtaining additional information later. The consumer is completely free in getting the additional information about an advertisement.

Advantages for the advertiser are:

a) reaching interested consumers directly on their will, creating a greater impact of the advertisement;

b) immediate measurable response based on number of times information about the advertisement was demanded by consumers;

c) increased impact on otherwise less interested consumers if being waiting travellers "playing" with their mobile phones;

d) greater impact due to being able to initiate contact with consumers who showed interest;

e) an advertising campaign can be adapted geographically and for specific groups of consumers based on measurement results from the above points a)-d).

In addition, a company who is renting billboards to actual advertisers may host the remote controller 12 himself to make measurements for the advertisers and for himself also to set the price for renting the advertiser devices 1 dependent on the measurement results.

The invention claimed is:

1. An advertisement system communicable with a mobile device equipped with a short-ranged wireless communication device and a mobile device controller, comprising:

one or more advertisement information communicable to a user associated with said mobile device;

an advertiser device for wirelessly communicating via a short-ranged wireless communication device said advertisement information to said mobile device;

an advertiser device controller coupled to said advertiser device for controlling the communication of said advertiser device wherein said controller is adapted to cause said advertiser device to communicate a particular portion of said advertisement information to said mobile device in response to receiving a request for additional information from said mobile device;

a remote controller storing subscriber information associated with said mobile device wherein said advertiser device establishes a communication link with said remote controller for retrieving said subscriber information;

wherein said advertiser device receives additional information associated with said user; and wherein said mobile device displays said identification information received from said wireless communication systems based on the signal strength of wireless reception from each of said wireless communication systems.

* * * * *